United States Patent [19]
Cuttress

[11] Patent Number: 5,887,545
[45] Date of Patent: Mar. 30, 1999

[54] PET DISH, KIT AND METHOD OF ASSEMBLING

[76] Inventor: Lloyd Cuttress, 62 Hoover Crescent, Orillia On., Canada, L3V 1K8

[21] Appl. No.: 46,771

[22] Filed: Mar. 23, 1998

[51] Int. Cl.[6] ....................................................... A01K 7/00
[52] U.S. Cl. ................................................................. 119/61
[58] Field of Search ...................................... 119/51.5, 61

[56] References Cited

U.S. PATENT DOCUMENTS

| | | | |
|---|---|---|---|
| 2,584,301 | 2/1952 | Sinclair | 119/61 |
| 4,658,759 | 4/1987 | Brown | 119/61 |
| 5,501,176 | 3/1996 | Tully | 119/61 |

*Primary Examiner*—Thomas Price
*Attorney, Agent, or Firm*—Robert E. Vernon

[57] ABSTRACT

The product is a specially designed pet food and water dish that would allow the pet owner to feed their pet without having to bend over to refill or pick up the feed dish. It is comprised of a fabricated molded double bowl food dish. A removable cylindrical handle attaches to center rear of the dish perpendicular to the base of the dish and extends upward. The handle has a soft grip to facilitate in lifting the dish to the counter, sink, table or the like and back to the floor.

5 Claims, 4 Drawing Sheets

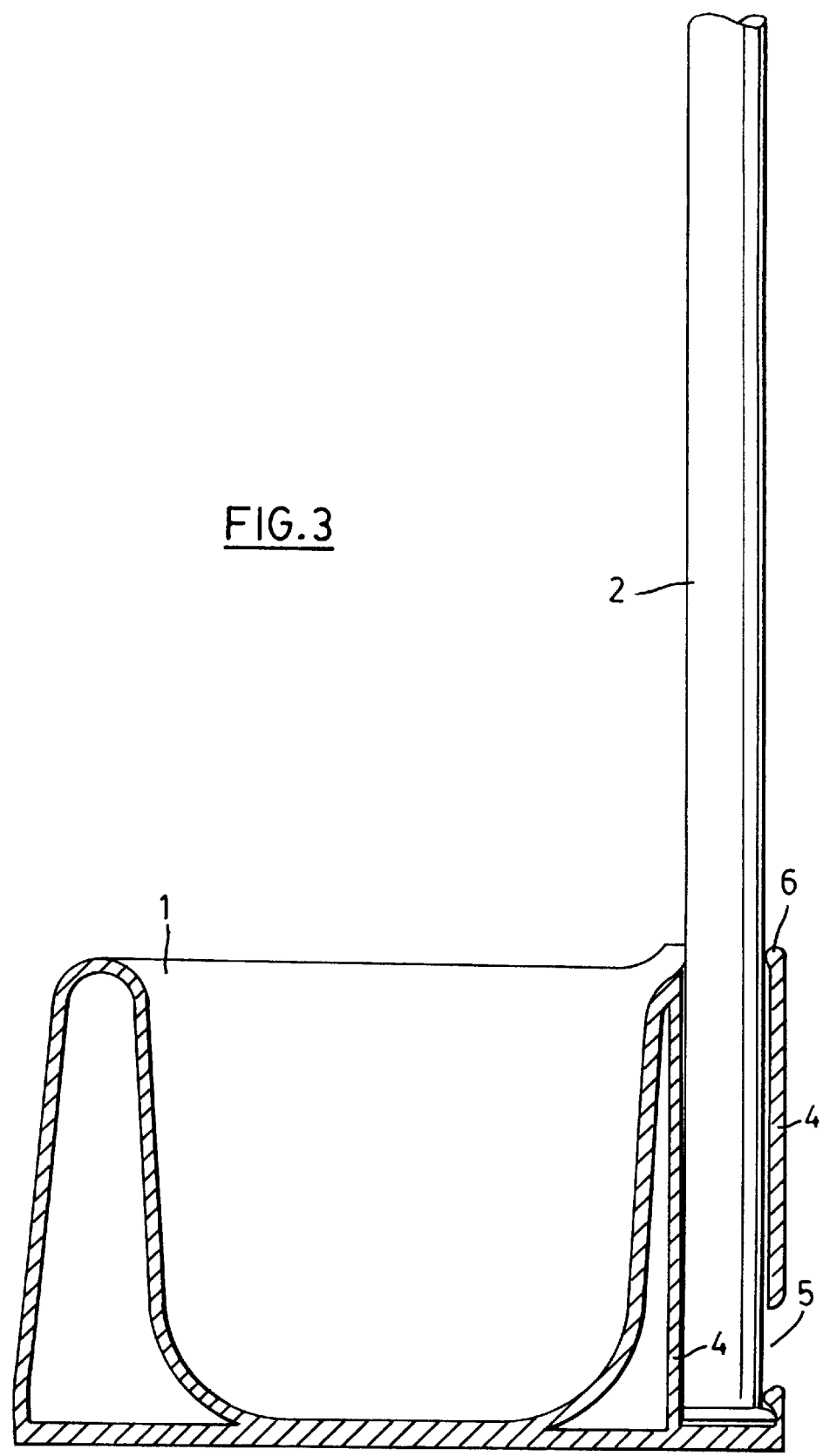

PET DISH, KIT AND METHOD OF ASSEMBLING

FIELD OF INVENTION

The invention relates to food and water dish for pets and more specifically to the filling and cleaning of the dish and the system of operation.

BACKGROUND OF INVENTION

This invention relates to a pet food and water dish.

Current pet dishes, on the market, sit on the floor and require the person filling or cleaning the dish to bend down to retrieve or replace the dish.

Nowhere in the known prior art is there a feeding system that emphasizes the stated advantages of this proposed invention, namely, for the care and comfort of the pet owner.

It is therefore an object of this invention to provide a pet feeding system that can be raised, lowered and manipulated by a simple action of the pet feeders arm and hand.

SUMMARY

As such, the general purpose of this invention is to provide a new, more effective method of retrieving a pet food and water dish, filling or cleaning the dish and replacing it to its' usable position on a floor level.

This device consists of a single or double bowl pet feed and/or water dish and a handle extending upwards from the dish to such a height as to make it easily retrieved and replaced by hand with no bending on the part of the operator This invention will benefit our older or senior population and pet owners who suffer from arthritic and other physical limitations.

Other prior art found relates to many different ways of pet feeding systems including disposable dish inserts, automatic food and water distributors, non-spill devices, etc.

To the best of my knowledge, I believe that a similar invention encompassing the benefits and advantages of the proposed invention is not available in the prior art. As such, it may be appreciated that there continues to be a need for a pet feeding dish that addresses both of the problems of ease of use as well as effectiveness in construction. This invention provides an enhanced pet feed and water dish and in this respect the present invention substantially fulfils this need.

BRIEF DESCRIPTION OF DRAWINGS

The embodiment of the invention is now described, by way of example, with reference to the accompanying drawings, of which:

FIG. 3 is a sectional side view of the invention showing its components.

DETAILED DESCRIPTION OF INVENTION

The invention is now described in detail and as shown in the accompanying drawings.

Figure 1:
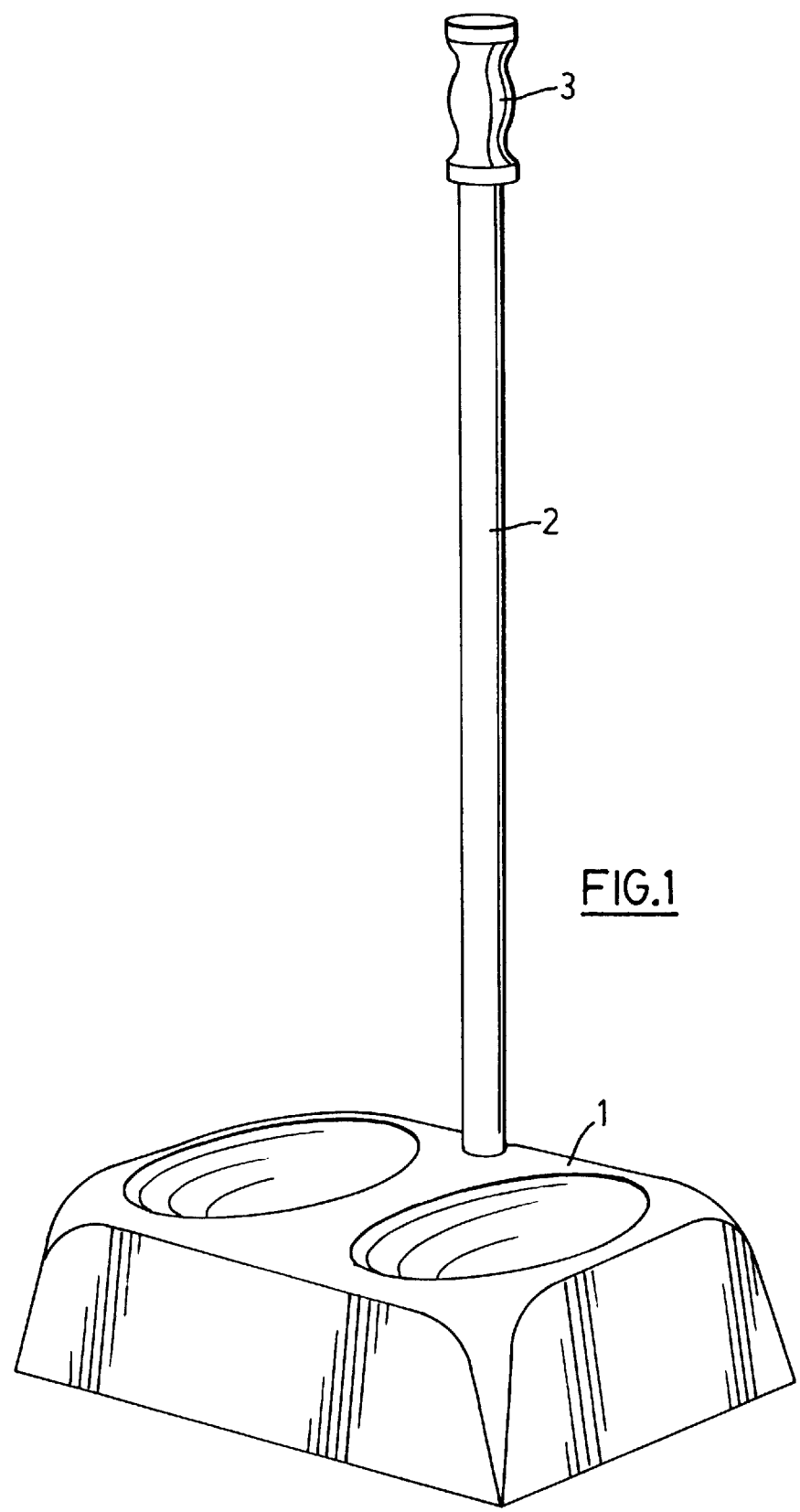
FIG. 1 is an overall view of the invention in its preferred embodiment.

FIG. 1 is an overall perspective view of the invention in its preferred embodiment. The invention consists of a one or two compartment feeding dish 1 that can be made of plastic for easy maintenance, lower production costs and ease of assembly to handle 2 made of tubular plastic. A soft sponge-like grip 3 is affixed to the uppermost end of the handle 2.

Figure 2:
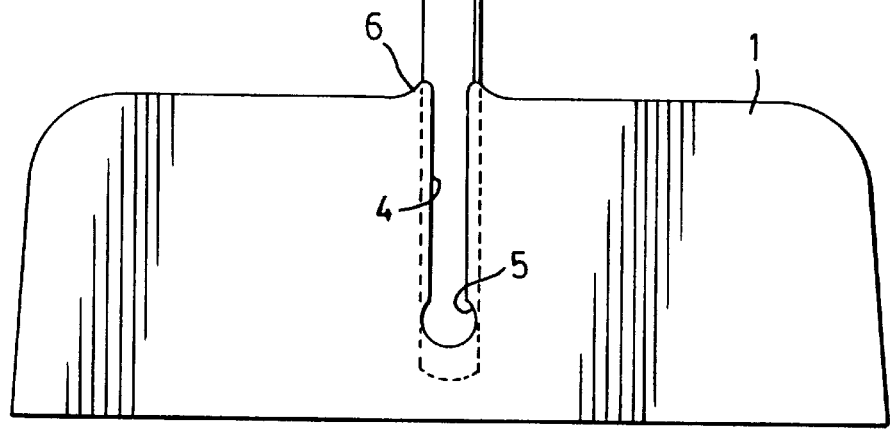
FIG. 2 is a rear view of the invention showing its components.
Figure 6:
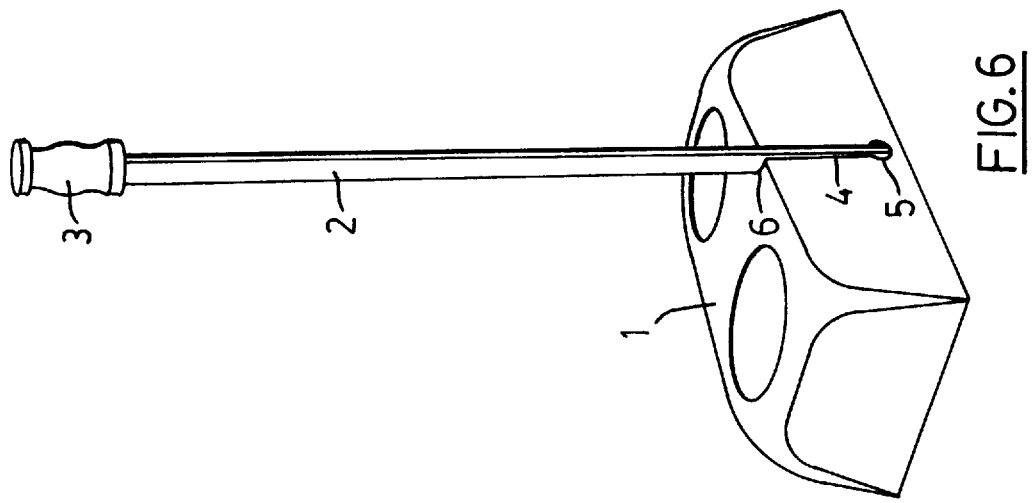
FIG. 4, FIG. 5 and FIG. 6 are perspective views of the invention showing the two main components as they are brought together and assembled.
Figure 5:
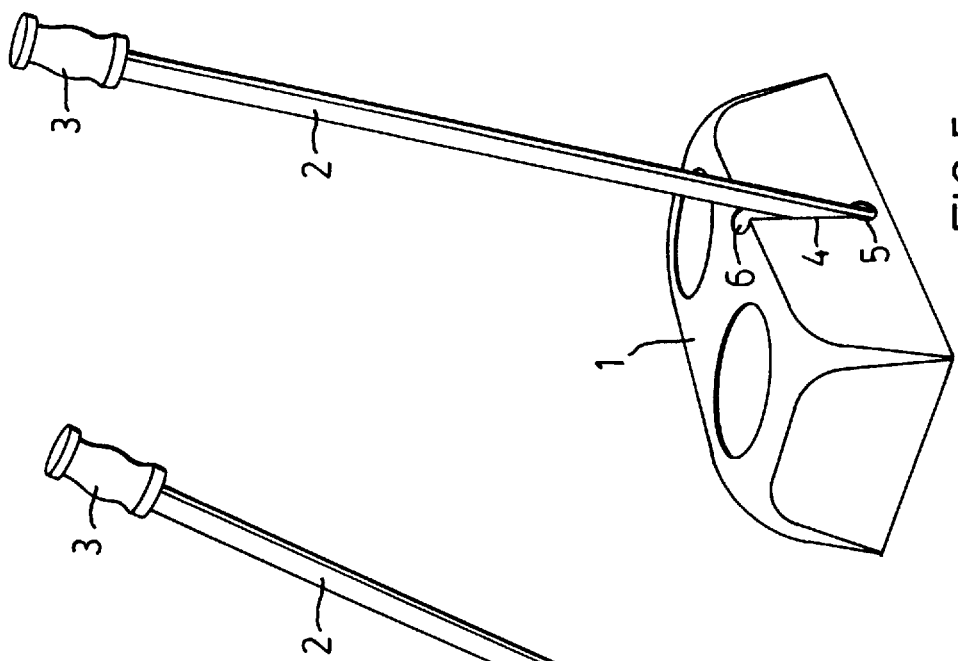
Figure 4:
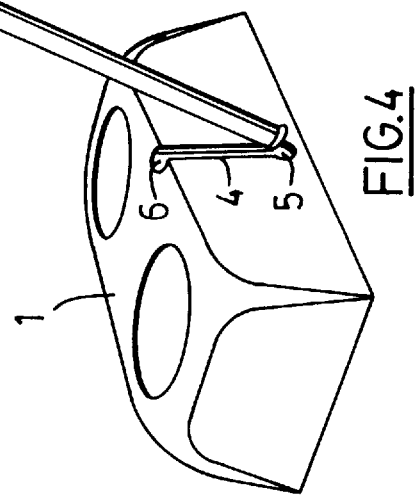

FIG. 2 shows the handle 2 attached in cylindrical retaining chamber 4 that is situated on the back or rear side of the pet dish 1. Handle 2 is also shown, by dotted lines, in FIG. 4. Also shown in FIG. 3 and FIG. 4 is the handle insertion orifice 5 and lock rim 6. Handle 2 is inserted into handle insertion orifice 5 as in FIG. 5 and moved toward an upright position FIG. 6 and finally snapped into cylindrical retaining chamber 4 and held tight and not allowed to slide upwards by lock rim 6 also shown in FIG. 2, FIG. 3 and FIG. 4.

The dish portion of this device could be molded in one piece in plastic affording the invention a smooth, washable and durable surface. This material would also be resilient as to allow the tubular plastic handle to "snap" into place within the cylindrical retaining chamber and be held by the lock rim. The sponge-like grip could be an "on the market" bicycle handle bar grip.

The invention has been shown and described herein in what is considered to be the most practical and preferred embodiment. It is recognized, however, that changes and modifications may be made to meet specific requirements. Such changes may be made without departing from the scope and spirit of the invention.

Having thus described my invention, what is claimed is:

1. A pet feeding apparatus, comprising a base and an elongated handle, wherein the base has a bottom, a top and a rear, the top has two bowls positioned therein, and the rear has a cavity extending from the top to essentially the bottom of the base, wherein the cavity has a longitudinal axis and is open at the top and open for a substantial portion of the rear, wherein the cavity has a retaining chamber portion at the bottom, and wherein the rear open portion has longitudinal edges with a gap therebetween, and the top of the cavity has a locking rim that holds the handle, and further wherein the bottom end of the handle is located in the retaining chamber and a portion of the handle adjacent to the bottom end of the handle is securely held in the cavity by the locking rim.

2. A pet feeding apparatus according to claim 1 wherein the distance between the longitudinal edges is marginally narrower than a cross-sectional diameter of the bottom portion of the handle so that the bottom of the handle can be snap fitted into the cavity.

3. A pet feeding apparatus according to claim 1 wherein an upper end of the handle has a sponge-like grip attached thereto.

4. A process for assembling a pet feeding apparatus which comprises a base and an elongated handle, wherein the base has a bottom, a top and a rear, the top includes two bowls positioned therein and the rear has a cavity extending from the top to essentially the bottom of the base, wherein the cavity has a longitudinal axis and is open at the top and open for a substantial portion of the rear, wherein the cavity has a retaining chamber portion at the bottom, and wherein the rear open portion has longitudinal edges with a gap therebetween, and the top of the cavity has a locking rim which holds the handle, and further wherein the bottom end of the handle is located in the retaining chamber and a portion of the handle adjacent to the bottom end of the handle is securely held in the cavity by the locking rim, in which the bottom end of the handle is inserted through the gap and into the retaining chamber; and levering the handle so that it pivots in the retaining chamber, until the portion of the handle adjacent to the bottom of the handle is forced through the gap between the longitudinal edges and into the cavity in order to secure the handle in the cavity.

5. a kit comprising a base for a pet feeding apparatus and an elongated handle, wherein the base has a bottom, a top and a rear, the top includes two bowls positioned therein and the rear has a cavity extending from the top to essentially the bottom of the base, wherein the cavity has a longitudinal axis and is open at the top and open for a substantial portion of the rear, wherein the cavity has a retaining chamber portion at the bottom, and wherein the rear open portion has longitudinal edges with a gap therebetween, and the top of the cavity has a locking rim which holds the handle, and further wherein the bottom end of the handle is located in the retaining chamber and a portion of the handle adjacent to the bottom end of the handle is securely held in the cavity by the locking rim.

* * * * *